United States Patent
Mathieu

(10) Patent No.: US 12,258,050 B2
(45) Date of Patent: Mar. 25, 2025

(54) CHAIRLIFT LOADING APPARATUS FOR THE LOADING OF PERSONS AND ITS ASSOCIATED DETECTION METHOD

(71) Applicant: POMA, Voreppe (FR)

(72) Inventor: Christian Mathieu, Seyssins (FR)

(73) Assignee: POMA, Voreppe (FR)

(*) Notice: Subject to any disclaimer, the term of this patent is extended or adjusted under 35 U.S.C. 154(b) by 180 days.

(21) Appl. No.: 17/221,488

(22) Filed: Apr. 2, 2021

(65) Prior Publication Data

US 2021/0347389 A1 Nov. 11, 2021

(30) Foreign Application Priority Data

Apr. 2, 2020 (FR) ........................... 2003319

(51) Int. Cl.
  *B61B 12/00* (2006.01)
  *A63G 27/00* (2006.01)
  *B61B 1/02* (2006.01)
  *E05F 15/73* (2015.01)
  *G01V 8/10* (2006.01)

(52) U.S. Cl.
  CPC .............. *B61B 12/00* (2013.01); *A63G 27/00* (2013.01); *B61B 1/02* (2013.01); *B61B 12/002* (2013.01); *E05F 15/73* (2015.01); *G01V 8/10* (2013.01)

(58) Field of Classification Search
  CPC .. B61B 1/00; B61B 1/02; B61B 12/00; B61B 12/002; E06B 7/28; E06B 11/08; E05F 15/73; A63G 27/00; A63G 31/00
  See application file for complete search history.

(56) References Cited

U.S. PATENT DOCUMENTS

2019/0226265 A1* 7/2019 Ahmad ................ G05B 19/416

FOREIGN PATENT DOCUMENTS

| CN | 108263392 A | * 7/2018 | ............. H05B 47/10 |
| DE | 10134180 A1 | * 1/2003 | ........... B61B 12/022 |
| EP | 0990571 A2 | 4/2000 | |
| EP | 2221227 A1 | 8/2010 | |

(Continued)

OTHER PUBLICATIONS

European Search Report for EP 21166359, mailed Aug. 6, 2021, 2 pages.

(Continued)

*Primary Examiner* — Zachary L Kuhfuss
*Assistant Examiner* — Cheng Lin
(74) *Attorney, Agent, or Firm* — RAY QUINNEY & NEBEKER P.C.; Paul N. Taylor

(57) ABSTRACT

The invention refers to a chairlift loading apparatus comprising at least two adjacent timing gates for regulating a flow of persons passing through said timing gates, the loading apparatus comprising a high-risk situation detection system comprising: a detection device capable of determining the presence of a potential person passing through each of the timing gates and determining whether the potential person is taller than a predetermined height; and a data processing unit configured to determine, from the data from the detection device, the existence of a high-risk situation when a person who is shorter than the predetermined height is detected in front of a given gate of the adjacent gates, and no person who is taller than the predetermined height is detected in front of one of the adjacent gates.

9 Claims, 1 Drawing Sheet

(56) References Cited

FOREIGN PATENT DOCUMENTS

| JP | H0721421 A | 1/1995 | |
|---|---|---|---|
| JP | 2017210345 A | 11/2017 | |
| JP | 6392033 B2 | 9/2018 | |
| KR | 20140058182 A * | 5/2014 | ............. A63G 31/00 |
| WO | WO-2016012631 A1 * | 1/2016 | ............ E05F 15/668 |

OTHER PUBLICATIONS

French Search Report from FR2003319, mailed Nov. 20, 2020, 2 pages.
Notice of Refusal for JP 2021-062546, mailed Oct. 28, 2024, 12 pages.

* cited by examiner

CHAIRLIFT LOADING APPARATUS FOR THE LOADING OF PERSONS AND ITS ASSOCIATED DETECTION METHOD

TECHNICAL FIELD OF THE INVENTION

The invention refers generally to the technical field of chairlift loading apparatus.

This invention refers more specifically to a chairlift loading apparatus for loading persons on a weight-bearing structure comprising a vehicle and to a method for detecting a high-risk situation on such a loading apparatus.

STATE OF THE ART

Today, chairlifts are known as passenger transportation devices comprising a haul rope and at least one support rope on which a carriage supporting single or multiple seats moves suspended at regular intervals on said support rope. In some configurations, the same cable can be both a haul rope and a support rope. Whatever the structure, each vehicle generally comprises a walkway attached to the haul rope by means of a fixed or disengageable clamp, the walkways being supported by the haul rope moving continuously between a loading station and an unloading station.

One of the primary concerns for chairlift manufacturers and purchasers is to guarantee optimal safety for the users. In particular, the safety of the users on the walkways or in the vicinity of the walkways must be guaranteed, whether the persons are adults or children.

To ensure the safety of the users on the chairlift, it is known to equip these walkways with a guardrail. Such a guardrail is moveable between an open or raised position allowing users to access the seats of the walkway, and a closed or lowered position, blocking this access and guaranteeing the safety of the persons sitting on the walkway during transport.

Chairlift manufacturers and purchasers of chairlifts are also obliged to comply with very specific regulations concerning the transport of children. In particular, children under 1.25 m in height may only be transported on a seat if they are accompanied by at least one person who is able to provide the necessary assistance to these children, particularly with the maneuvering of the guardrail and following the safety instructions. In the case of a supervised group, it is the responsibility of the group's leaders to organize the allocation of children to the seats in compliance with the apparatus provided by the operator and to ensure, prior to loading, that the people impacted by the accompaniment of the children do not object to it.

Another concern of chairlift manufacturers and buyers is to design an apparatus that offers the best cost per hour flow ratio while ensuring sufficient user flow.

DESCRIPTION OF THE INVENTION

The invention aims to remedy all or part of the disadvantages of the state of the art by proposing in particular a solution that will improve the hourly flow of the number of transported users while still guaranteeing the safety of the users, and in particular of the children.

To this end, according to a first feature of the invention, a chairlift loading apparatus for loading people on a weight-bearing structure is proposed, the loading apparatus comprising at least two adjacent timing gates for regulating a flow of persons to be loaded, who pass through said timing gates, the loading apparatus being remarkable in that it comprises a system for detecting a high-risk situation comprising at least:

one detection device able to determine the potential presence of a person when passing through each of the timing gates and to determine whether this person is taller than a predetermined height;

one data processing unit configured to determine, from the data from the detection device, the existence of a high-risk situation when a person who is shorter than the predetermined height is detected in front of a given gate among the adjacent gates, and no person who is taller than the predetermined height is detected when passing through at least one of the gates adjacent to the given gate.

Such a combination of features allows for a loading apparatus equipped with a detection system allowing for the detection of a high-risk situation corresponding to the presence of an unaccompanied child directly beside an adult.

According to an embodiment, the predetermined height corresponds to a height between 1 m and 1.5 m, preferably equal to 1.25 m.

In one embodiment, each timing gate is movable between two timed end positions, namely a closed position where it blocks access to the given gate and an open position where it provides access to the given gate. In one particular configuration, each gate comprises a post standing vertically with respect to the ground and supporting a locking arm extending in a horizontal plane, the locking arm being pivotally connected with a vertical axis with respect to the post and movable between a closed position where it blocks access to the gate by extending substantially transversely with respect to the direction of travel of the users, and an open position where the locking arm is pivoted so as to lie longitudinally with respect to the direction of travel of the users, preferably in the direction of travel.

According to an embodiment, the opening and closing movements of the timing gates are synchronized in order to allow all users who are ready to be loaded, to load at the same time on the same walkway. The closing of each gate can be anticipated as soon as the passage of a user is detected.

According to an embodiment, the data processing unit is connected to an opening command from each gate, and is able to inhibit the opening or to force the holding in the closed position of the given gate among the adjacent gates during the passage of which a person who is shorter than the predetermined height has been detected, as long as a person who is taller than the predetermined height has not been detected during the passage of at least one of the gates adjacent to the given gate. Such a configuration makes it possible to further guarantee the security of the loading apparatus by compensating for a possible lack of vigilance on the part of a supervisor.

In one embodiment, the data processing unit is connected to a warning system, the warning system preferably comprising an audible and/or visual horn. Such a warning system makes it possible to alert a loading area supervisor when such a high-risk situation is encountered, and in particular when a child is about to load without being duly accompanied by an adult.

In one embodiment, the detection device comprises at least a first presence sensor for each timing gate capable of determining the presence of any person taller than a predetermined height and/or a second presence detector for each timing gate capable of determining the presence of any person shorter than a predetermined height. Such sensors are easy to manufacture and install on timing gates, either for new gates or to equip existing timing gates.

According to an embodiment, the detection device, preferably the first and/or second presence detector, comprises at least one sensor, preferably a sensor comprising at least one photocell.

According to an embodiment, the detection device comprises at least one camera, preferably a single camera. Preferably in this case, the data processing unit is able to determine the existence of a high-risk situation from an image or a set of images common to all the gates.

According to another feature of the invention, the latter relates to a method for detecting a high-risk situation on a loading apparatus as described above, remarkable in that it comprises at least:

one detection step configured to determine the presence of a potential person as they pass through each of the timing gates and determine if the potential person is taller than a predetermined height;

one data processing step configured to determine, from the data arising from the detection step, the existence of a high-risk situation when a person who is shorter than the predetermined height is detected in front of a given gate among the adjacent gates, and no person who is taller than the predetermined size is detected when passing through at least one of the gates adjacent to the given gate.

According to an embodiment, the detection method comprises a warning step in which a warning signal is activated upon detection of a high-risk situation, preferably an audible and/or visual warning step.

BRIEF DESCRIPTION OF THE DRAWINGS

Further features and advantages of the invention will become apparent from the following description, with reference to the attached figures, which illustrate.

For the sake of clarity, identical or similar features are marked with identical reference symbols throughout the figures.

In the description and in the claims, to clarify the description and the claims, the terms longitudinal, transverse and vertical will be adopted with reference to the X, Y, Z trihedrons shown in the figures.

DETAILED DESCRIPTION OF AN EMBODIMENT

Figure 1:
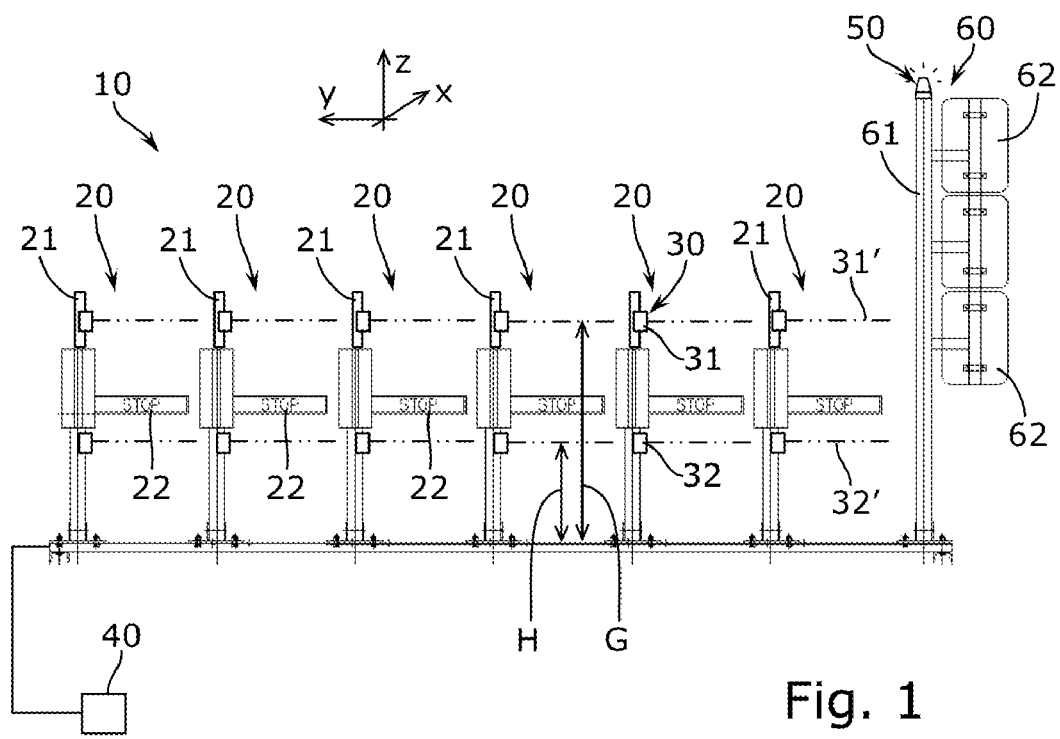
FIG. 1: a front view of a loading apparatus comprising a plurality of timing gates in one embodiment.
Figure 2:
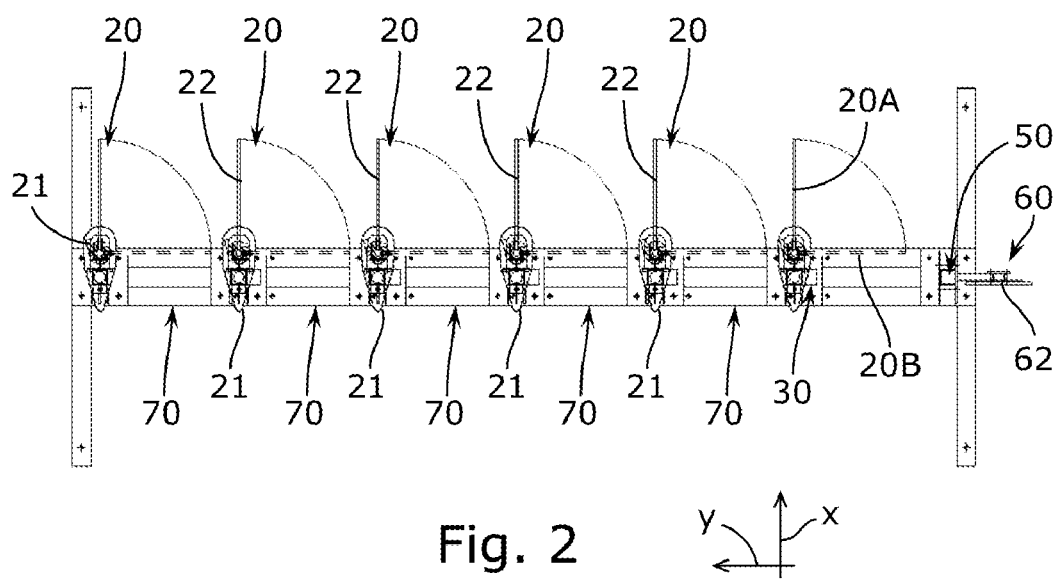
FIG. 2: a top view of FIG. 1.

With reference to FIGS. 1 and 2, a chairlift loading apparatus 10 for loading persons on a walkway forming a weight-bearing structure (not shown) is illustrated. The loading apparatus 10 includes six timing gates 20, arranged adjacent to each other, aligned along an axis Y transverse to the direction of travel of users heading to a loading platform (not shown) to load the walkways. The direction of travel of the users extends along a longitudinal reference axis X.

The number of timing gates 20 corresponds precisely to the number of places, in particular seats, on the chairlift walkways. The timing gates 20 are intended to regulate a flow of people to be loaded, these people having to pass through said timing gates 20 one by one to access the loading platform located downstream of the gates 20 in the direction of travel X. Each timing gate 20 is movable between two extreme timed positions, namely a closed position 20A where it blocks access to the given gate 20 and an open position 20B where it provides access to the given gate 20 (see FIG. 2). To ensure better flow, the loading apparatus 10 is configured so that the opening and closing movements of the timing gates 20 are synchronized. The timing gates 20 are therefore programmed to open at the same time and close either at the same time or as soon as a user passes through. Each timing gate 20 is associated, locally, with an access lane 70 intended for the passage of a person. In practice, each access lane 70 may be indicated on the loading apparatus with floor markings or barriers, or it may be realized on the simple passage limited mainly by the timing gates themselves. Regardless of the solution chosen, in all cases, one person at a time may stand in front of a timing gate 20 and pass through it in a timed passage, whether or not people upstream are waiting for their passage in an organized fashion in line.

Each timing gate 20 comprises a vertical post 21, i.e. parallel to a vertical axis Z. Each timing gate 20 further comprises a locking arm 22 extending, in a non-limited manner, substantially perpendicular to the vertical post 21 and in a pivotal connection with vertical axis Z with respect to said post 21. The locking arm 22 is rotatable relative to the post 21 between a closed position where it blocks access to the gate 20 by extending substantially transversely to Y with respect to the direction of travel of the users X, and an open position where the locking arm pivots, preferably forward with respect to the direction of travel X, so as to be positioned longitudinally with respect to the direction of travel of the users and to not constitute a hindrance in the manipulation of the locking arm 22.

Each access lane 70 is bordered on one side, left in the figures, by a post 21 of a timing gate 20 of the given access lane 70, and on another side, right in the figures, by a post 21 of the gate 20 adjacent to the given gate 20. For an outside access lane 70 that would not have an adjacent lane on the other side, the access lane 70 is bordered by a post such as a post 61 of at least one signaling device 60, on which signaling panels 62, among other things, may be installed. The spaces between these posts, 21, 61 create access lanes 70.

According to an advantageous embodiment, all of the timing 20 gates 20 are connected by means of a base ensuring the connection of the gates 20 by connecting the lower ends of the posts 21, 61 embodying the lanes 70. Such a base ensures the stability of the gate structure 20.

In accordance with the invention, the loading apparatus 10 comprises a high-risk situation detection system comprising at least one detection device 30 capable of determining the presence of a potential person when passing through each of the timing gates 20 and determining whether the potential person is taller than a predetermined height G. In particular, a suitable height G is determined corresponding to an average height of a child, for example 1.25 m.

In the embodiment illustrated in FIGS. 1 and 2, the detection device 30 comprises at least one first presence detector 31 for each timing gate 20 capable of determining the presence of any person who is taller than or equal to the predetermined height G and a second presence detector 32 for each timing gate 20 capable of determining the presence of any person who is shorter than a predetermined height.

More precisely, each timing gate 20 is equipped with a first and a second presence detector 31, 32 which each comprise a sensor such as a sensor comprising at least one photoelectric cell. The first presence detector 31 is placed at a height of 1.25 m so as to determine the presence of a potential person who is taller than or equal to the predetermined height G. In addition, the second presence detector 32, in order to determine the presence of a potential person who is shorter than a predetermined height, is positioned at an intermediate height H, less than the predetermined height G. A height H is chosen that is high enough to avoid any interaction with anything that could constitute an obstacle at ground level, or even the level of the snow, but low enough to detect the passage of a potential person. For example, a height H of between 0.5 m and 1 m could be chosen.

The first and second detectors 31, 32 are photoelectric cells each emitting a beam 31', 32' of light that will be placed preferably in a horizontal plane and oriented transversely to Y with respect to the access lane 70, i.e. also with respect to the direction of movement of the users X. In this way, a photoelectric cell from the first detector, being placed at a height G of 1.25 m, is able to detect the passage of any person with a height of 1.25 m and greater. In a similar way, a photoelectric cell of the first detector, being placed at a height H lower than the height, for example of 0.75 m with respect to the ground, is able to detect the passage of any person even of a height less than the predetermined height.

In this embodiment, the first and second sensors 31, 32 of each gate 20 are borne by the associated vertical post 21 and guided along the axis transverse to the direction of travel. Preferably, the posts 21 have a longitudinally elongated profile, or section. In this manner, a post 21 can support a locking arm 22 and the first and second detectors 31, 32, and more generally the detection device 30 with a longitudinal offset. Alternatively, or additionally, it can be provided for that the sensor beams 31', 32' are guided horizontally at an angle to the transverse axis Y so as to allow detection of the person upstream of the gate.

Alternatively, or in combination, the detection device 30 may be at least partially remote from the gates. In this case, all or part of the detection device 30 may be at the level of the boarding gates 20. It can also be offset by a predetermined distance, for example a few meters upstream of the front gates 20 in order to anticipate the alarm of the horns.

The loading apparatus 10 also comprises a data processing unit 40, preferably remote from the timing gates 20 and configured to determine, from the data from the detection device 30, in particular from the presence sensors 31, 32, the existence of a high-risk situation when a person who is shorter than the predetermined height G is detected in front of a given gate 20 among the adjacent gates 20, and no person who is taller than the predetermined height G is detected when passing through at least one of the gates 20 adjacent to the given gate 20.

The data processing unit 40 is connected to a command for opening each gate 20, and is capable of inhibiting the opening or forcing the holding in the closed position of the given gate 20 among the adjacent gates 20 through which a person who is shorter than the predetermined size has been detected, as long as a person who is taller than the predetermined size has not been detected through at least one of the gates 20 adjacent to the given gate 20. In this way, it is possible to constrain the apparatus so as to avoid a high-risk situation. Additionally, or alternatively, the data processing unit 40 is connected to a warning system 50, such as an audible and/or visual horn 50. A visual warning device may be arranged, for example, on an upper end of the post 61 of the signaling device 60. Of course, other configurations are possible. For example, one warning device may be provided for each timing gate 20, with a separate warning signal being activated in the event of a high-risk situation being detected for any of the timing gates 20 concerned. This allows the high-risk situation to be located quickly.

When the system is in use, one or more people appear in front of the timing gates 20, with at most one person positioned along a lane in front of the locking arm 22 of the given gate 20, which is in the closed position 20A which blocks passage.

Then, a detection step is implemented to determine the presence of a potential person when passing through each of the timing gates 20 and to determine whether the potential person is taller than the predetermined height G, namely here a height over 1.25 m. This step is implemented as soon as a person comes to stand in the path of a beam 31', 32' of light from the photoelectric cells of the first and second detectors 31, 32.

Once the information has been collected for each of the timing gates 20, a data processing step is implemented to determine, from the data arising from the detection step, the existence of a high-risk situation when a person who is shorter than the predetermined height G is detected in front of a given gate 20 among the adjacent gates 20, and no person who is taller than the predetermined height is detected when passing at least one of the gates 20 adjacent to the given gate 20.

If the high-risk situation is not detected, then the locking arms 22 of the relevant gates 20 can pivot forward, in the direction of travel, to move to the open position 20B, providing access to the passage by the person, and then return to the closed position 20A, where they block passage. This return can be carried out after a predetermined time delay of the opening, or after detection of the passage of the person. The detection of the passage can be performed by the presence sensors 31, 32 and a time delay can be combined with the detected signal so that once a sensor detects a change of state, from a person present to a person absent state, a certain time delay elapses before closing the gate 20 concerned. Each timing gate 20 facilitates the synchronization of passenger boarding at the chairlift loading area, so as to avoid, in particular, any collision between the seats and the passengers, before they are picked up.

The loading apparatus is configured so that each timing gate 20 opens automatically as soon as the seat for the preceding passengers is engaged in the loading area upstream from the gates 20, allowing the passengers time to reach the loading area before the arrival of the seat to pick them up at the loading area.

If the high-risk situation is detected, namely in front of a timing gate 20, where a person who is shorter than the predetermined height G, is detected and no person who is taller than the predetermined height is detected when passing at least one of the gates 20 adjacent to the given gate 20, then a warning step is implemented in which the warning signal is transmitted to the horn 50 and the given gate remains in the closed position 20A until no further high-risk situation is detected. The area supervisor can then view the gate and intervene if necessary.

Naturally, the invention is described in the foregoing by using examples. It is understood that the person skilled in the art is capable of realizing different variants of the invention without going beyond the scope of the invention.

It is emphasized that all the features, as they become apparent to a person skilled in the art from this description, the drawings and the attached claims, even if they have only been described in relation to certain other features, both individually and in any combination, can be combined with other features or groups of features disclosed herein, provided that this has not been expressly excluded or that technical circumstances make such combinations impossible or meaningless.

The invention claimed is:

1. A chairlift loading apparatus for loading persons on a weight-bearing structure, the loading apparatus comprising at least two adjacent timing gates for regulating a flow of persons to be loaded passing through the said timing gates, the loading apparatus being characterized in that the loading apparatus comprises a system for detecting a high-risk situation comprising:
   a detection device capable of determining a presence of a potential person when passing through each of the timing gates and determining whether the potential person is taller than a predetermined height;
   a data processing unit configured to determine, from the data from the detection device, an existence of a high-risk situation when a person who is shorter than the predetermined height is detected in front of a given gate among the adjacent gates, and no person who is taller than the predetermined height is detected when passing at least one of the gates adjacent to the given gate; and
   a data processing unit configured to determine that a high-risk situation is not detected when a person who is shorter than the predetermined height is detected in front of a given gate among the adjacent gates, and a person who is taller than the predetermined height is detected when passing at least one of the gates adjacent to the given gate.

2. A loading apparatus according to claim 1, wherein each timing gate is movable between two extreme timed positions, namely a closed position where each timing gate blocks access to the given gate and an open position where each timing gate provides access to the given gate.

3. A loading apparatus according to claim 2, wherein opening and closing movements of the timing gates are synchronized, it being possible to anticipate a closing of each gate as soon as a passage of a user is detected.

4. A loading apparatus according to claim 1, wherein that a data processing unit is connected to a command for opening each gate and adapted to inhibit the opening or to force holding in a closed position of the given gate among the adjacent gates through which a person who is shorter than the predetermined height has been detected, as long as a person who is taller than the predetermined height has not been detected through at least one of the gates adjacent to the given gate.

5. A loading apparatus according to claim 1, characterized in that a data processing unit is connected to a warning system, the warning system preferably comprising an audible and/or visual horn.

6. A loading apparatus according to claim 1, characterized in that the detection device comprises at least one first presence detector for each timing gate capable of determining the presence of any person who is taller than a predetermined height and/or a second presence detector for each timing gate capable of determining the presence of any person who is shorter than a predetermined height.

7. A loading apparatus according to claim 6, wherein the detection device, preferably the first and/or second presence detector, comprises at least one sensor, preferably a sensor comprising at least one photocell.

8. A method for detecting a high-risk situation on a loading apparatus according to claim 1, further comprising:
   detecting a presence of a potential person as they pass through each of the timing gates and determine if the potential person is taller than a predetermined height;
   determining, from the data arising from the detection step, an existence of a high-risk situation in front of the given gate, among the adjacent gates, when a person who is shorter than the predetermined height is detected, and no person who is taller than the predetermined height is detected when passing through at least one of the gates adjacent to the given gate.

9. A method for detecting a high-risk situation according to claim 8, further comprising activating a warning signal is activated upon detection of a high-risk situation, preferably an audible and/or visual warning step.

* * * * *